Patented Nov. 23, 1926.

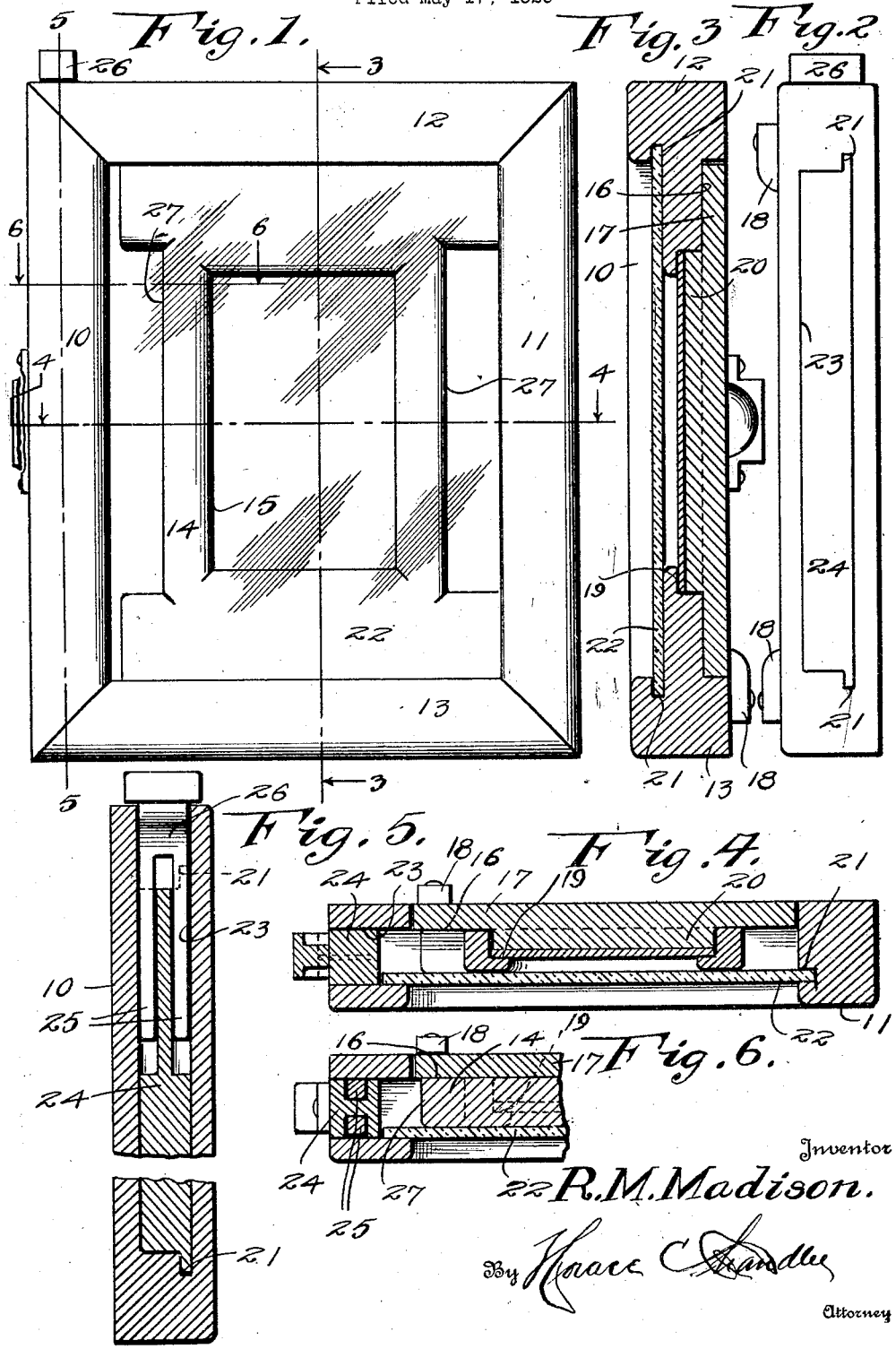

1,608,409

UNITED STATES PATENT OFFICE.

ROBERT M. MADISON, OF GARY, INDIANA.

PICTURE FRAME.

Application filed May 17, 1926. Serial No. 109,635.

This invention relates to new and useful improvements in picture frames.

One object of the invention is to provide a frame wherein a picture may be placed without the necessity of removing or moving the glass.

Another object is to provide novel means for retaining the sheet of glass within the frame.

Other objects and advantages will be apparent from the following description when taken in connection with the accompanying drawing.

In the drawing:

Figure 1 is a front elevation of a picture frame made in accordance with the present invention.

Figure 2 is a side elevation of the same, showing the means for holding the glass therein.

Figure 3 is a vertical longitudinal central sectional view on the line 3—3 of Figure 1.

Figure 4 is a transverse sectional view on the line 4—4 of Figure 1.

Figure 5 is a longitudinal section on the line 5—5 of Figure 1.

Figure 6 is a transverse sectional view on the line 6—6 of Figure 1.

Referring particularly to the accompanying drawing, there is shown a rectangular frame including the vertical side members and the upper and lower cross members, represented, respectively, at 10—11 and 12—13. The said frame members are connected by an intermediate web 14, and through the center of this web is formed the opening 15, through which a picture may be seen. This web 14 is spaced from the rear face of the frame to provide the seat 16 for the removable back board 17, which board is held in said seat by the turnbuttons 18, carried by the frame. Surrounding the opening 15, and formed in the rear face of the web 14, is a seat 19, for receiving a picture, and to receive the retaining boss 20 carried by the inner face of the back board. The front face of the web 14 is spaced inwardly of the front face of the frame, and formed in the inner face of the frame are the grooves 21 which receive the edge portions of the sheet of glass 22. In one of the vertical members, preferably the one numbered 10, there is formed a longitudinal opening 23, through which the said glass is inserted in said grooves. A block 24 is inserted in said opening to engage with the adjacent edge of the glass. In the front and rear faces of the upper end portion of this block there are formed the longitudinal grooves 25, which receive the legs of the bifurcated pin 26, introduced through an opening in the upper member of the frame, such legs fitting snugly within said grooves to maintain the block within the opening 23. In the web 14, at opposite sides of the opening 15, are vertically arranged elongated openings 27, for additional pictures, or for ornamental panels.

Attention is particularly called to the fact that the entire picture frame, with the exception of the glass retaining means, is formed from a single piece of material, thus obviating joints, and fastening means or glue.

What is claimed is:

1. A picture holder comprising a frame having an intermediate web connecting the members of the frame, the inner face of the frame, outwardly of the web having a glass receiving groove, the web being formed with a sight opening and having a picture receiving seat surrounding the opening in the rear face of the web, and means in one of the side members of the frame for retaining the glass in said grooves.

2. A picture holder comprising an enclosing frame having an intermediate integral web, the front and rear faces of the web being spaced inwardly from the front and rear faces of the frame, respectively, the web having an opening surrounding which is formed a picture receiving seat, a back board having a boss for disposition within said seat to retain the picture therein, the frame outwardly of the web having a glass receiving groove, one of the side members of the frame having an opening for the insertion of the glass, a block seated in the opening and having grooves, and a bifurcated pin carried by the frame and engaged in the grooves of the block.

In testimony whereof, I affix my signature.

ROBERT M. MADISON.